US012736359B2

(12) United States Patent
Fernandez Gonzalez et al.

(10) Patent No.: US 12,736,359 B2
(45) Date of Patent: Sep. 15, 2026

(54) MACHINE LEARNING TECHNIQUES FOR TRAVERSAL PATH OPTIMIZATION

(71) Applicant: Optum, Inc., Minnetonka, MN (US)

(72) Inventors: Yiriliam Fernandez Gonzalez, Mint Hill, NC (US); Ramprasad Anandam Gaddam, Mumbai (IN); Gregory J. Boss, Saginaw, MI (US); Jon Benjamin Griffith, Minneapolis, MN (US)

(73) Assignee: Optum, Inc., Minnetonka, MN (US)

( * ) Notice: Subject to any disclaimer, the term of this patent is extended or adjusted under 35 U.S.C. 154(b) by 1033 days.

(21) Appl. No.: 17/744,322

(22) Filed: May 13, 2022

(65) Prior Publication Data

US 2023/0366687 A1 Nov. 16, 2023

(51) Int. Cl.
*G06N 20/00* (2019.01)
*G01C 21/34* (2006.01)

(52) U.S. Cl.
CPC ......... *G01C 21/3461* (2013.01); *G06N 20/00* (2019.01)

(58) Field of Classification Search
CPC ....... G01C 21/3461; G06N 20/00; G06N 3/08
See application file for complete search history.

(56) References Cited

U.S. PATENT DOCUMENTS

| | | | |
|---|---|---|---|
| 8,624,727 | B2 | 1/2014 | Saigh et al. |
| 9,454,889 | B2 | 9/2016 | Kerning |
| 9,547,972 | B2 | 1/2017 | Castillo |
| 9,648,481 | B2 | 5/2017 | Grice et al. |
| 9,860,721 | B2 | 1/2018 | Nam |
| 9,861,151 | B2 | 1/2018 | Ciaramelletti et al. |
| 10,013,871 | B1 | 7/2018 | Braun |
| 10,586,437 | B1 | 3/2020 | Slavin et al. |
| 10,972,892 | B2 | 4/2021 | Phillips |
| 11,076,036 | B2 | 7/2021 | Melendez et al. |

(Continued)

FOREIGN PATENT DOCUMENTS

| | | | |
|---|---|---|---|
| WO | 02/33620 | A1 | 4/2002 |
| WO | 2020/117224 | A1 | 6/2020 |

OTHER PUBLICATIONS

"Snapshot: New App Provides Emergency Response Vehicles With The Fastest, Safest Path to Incident Scenes," Science and Technology, U.S. Department of Homeland Security, Jun. 4, 2019, (6 pages), (article), [Retrieved from the Internet Jan. 17, 2022] <URL: https://www.dhs.gov/science-and-technology/news/2019/06/04/snapshot-new-app-provides-responders-fastest-safest-path>.

(Continued)

*Primary Examiner* — Tamara T Kyle
*Assistant Examiner* — William Wong
(74) *Attorney, Agent, or Firm* — Alston & Bird LLP

(57) ABSTRACT

Various embodiments of the present invention disclose techniques for traversal path optimization given a traversal network comprising a group of nodes comprising a plurality of navigation orchestration nodes and using a traversal path optimization machine learning model. In some embodiments, a path feature set is determined for each candidate traversal path of a plurality of candidate traversal paths. A traversal path optimization machine learning model is configured to generate path scores for each candidate traversal path based at least in part on the path feature set.

20 Claims, 7 Drawing Sheets

600

(56) References Cited

U.S. PATENT DOCUMENTS

| | | | | |
|---|---|---|---|---|
| 2010/0286567 | A1* | 11/2010 | Wolfe | A61B 5/4818 600/587 |
| 2012/0179002 | A1 | 7/2012 | Brunetti et al. | |
| 2015/0077502 | A1* | 3/2015 | Jordan | G16H 80/00 348/14.03 |
| 2018/0048998 | A1 | 2/2018 | Mahajan et al. | |
| 2018/0165945 | A1 | 6/2018 | McClendon et al. | |
| 2018/0356241 | A1* | 12/2018 | Correnti | H04L 67/12 |
| 2019/0036630 | A1* | 1/2019 | Svennebring | H04W 40/12 |
| 2020/0043098 | A1 | 2/2020 | Patil | |
| 2020/0085380 | A1 | 3/2020 | Sampson | |
| 2020/0258374 | A1 | 8/2020 | Mehta et al. | |
| 2020/0318982 | A1* | 10/2020 | Shirani-Mehr | G06V 20/52 |
| 2020/0404090 | A1 | 12/2020 | Cohen | |
| 2021/0052221 | A1 | 2/2021 | Panneer Selvam et al. | |
| 2022/0196425 | A1* | 6/2022 | Xu | H04W 24/10 |

OTHER PUBLICATIONS

Castellucci, Maria. "Unnecessary ED Visits From Chronically Ill Patients Cost $8.3 Billion," Modern Healthcare, Feb. 7, 2019, (10 pages), (article, online), [Retrieved from the Internet Jul. 15, 2022] <URL: https://www.modernhealthcare.com/article/20190207/TRANSFORMATION03/190209949/unnecessary-ed-visits-from-chronically-ill-patients-cost-8-3-billion>.

Garnsworthy, Jasmine. "No, Using a Personal Safety App Doesn't Make You Paranoid," StyleCaster, Aug. 4, 2021, (16 pages), (article, online), [Retrieved from the Internet Jul. 15, 2022] <URL: https://stylecaster.com/personal-safety-app/>.

Gilmore, Lauren. "7 Essential Personal Safety Apps For Emergency Situations," The Next Web, Nov. 17, 2015, (12 pages), (article, online), [Retrieved from the Internet Jul. 15, 2022] <URL: https://thenextweb.com/news/7-essential-personal-safety-apps-for-emergency-situations>.

Moore, Brian J. et al. "Costs of Emergency Department Visits in the United States, 2017," Department of Health & Human Services, Agency for Healthcare Research and Quality, Dec. 2020, (11 pages), [Retrieved from the Internet Jul. 15, 2022] <URL: https://www.hcup-us.ahrq.gov/reports/statbriefs/sb268-ED-Costs-2017.jsp>.

Rodriquez-Rodriguez, Ignacio et al. "An Autonomous Alarm System for Personal Safety Assurance of intimate Partner Violence Survivors Based on Passive Continuous Monitoring Through Biosensors," Symmetry, Mar. 14, 2020, vol. 12, No. 3:460, pp. 1-18, DOI: 10.339/sym12030460.

* cited by examiner

External Computing Entities 102

Predictive Analysis Engine 110

Training Engine 112

Predictive Data Analysis Computing Entity 106

Model Definition Data Store 121

Training Data Store 122

Storage Subsystem 108

Predictive Data Analysis System 101

600

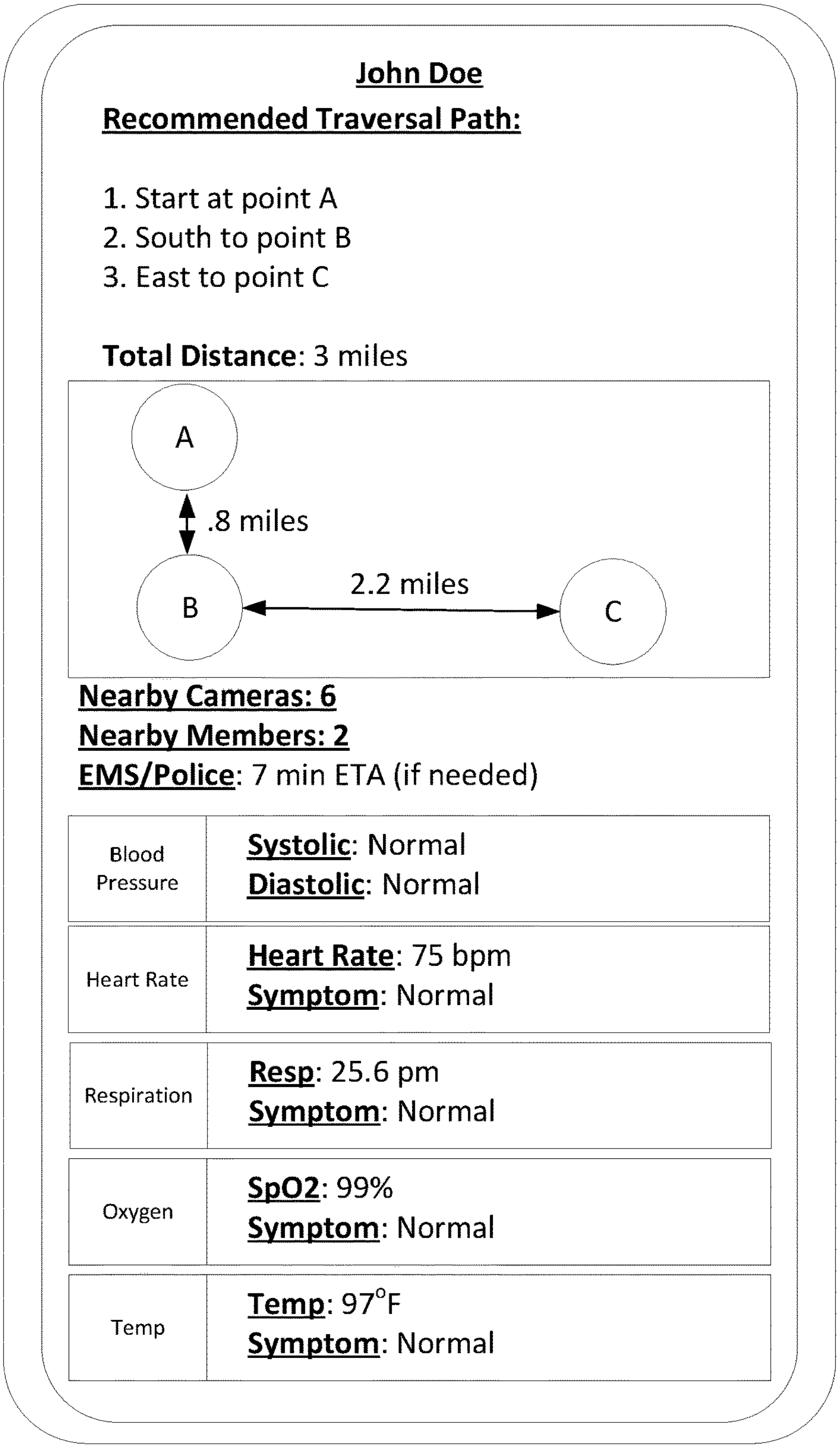

FIG. 6

John Doe

Recommended Traversal Path:

1. Start at point A
2. South to point B
3. East to point C

Total Distance: 3 miles

Nearby Cameras: 6
Nearby Members: 2
EMS/Police: 7 min ETA (if needed)

| | |
|---|---|
| Blood Pressure | **Systolic**: Normal<br>**Diastolic**: Normal |
| Heart Rate | **Heart Rate**: 75 bpm<br>**Symptom**: Normal |
| Respiration | **Resp**: 25.6 pm<br>**Symptom**: Normal |
| Oxygen | **SpO2**: 99%<br>**Symptom**: Normal |
| Temp | **Temp**: 97°F<br>**Symptom**: Normal |

MACHINE LEARNING TECHNIQUES FOR TRAVERSAL PATH OPTIMIZATION

BACKGROUND

Various embodiments of the present invention address technical challenges related to accurately and efficiently determining an optimal traversal path of a traversal network. In doing so, various embodiments of the present invention make important contributions to various existing predictive data analysis systems.

BRIEF SUMMARY

Various embodiments of the present invention disclose techniques for determining a traversal path optimization. In some embodiments, a system may receive a traversal path optimization request describing traversal path request data indicative of at least an origin node and a destination node. A path score may be determined for each candidate path of a plurality of candidate paths using a traversal path optimization machine learning model. Using some of the techniques described herein, a proposed system can select an optimal traversal path from the plurality of candidate traversal paths and provide the selected optimal traversal path to the user device.

In accordance with one aspect, a method includes: receiving a traversal path optimization request from a user device, wherein the traversal path optimization request describes traversal path request data indicative of at least an origin node and a destination node; for each navigation orchestration node, determining, using a node-wise coverage region determination machine learning model, and based at least in part on node feature data describing at least a current operational environment of a corresponding navigation orchestration device that is associated with the navigation orchestration node, a coverage region of the navigation orchestration node; for each candidate traversal path of a plurality of candidate traversal paths: determining a path feature set describing at least a related orchestration node subset of the plurality of navigation orchestration nodes for the candidate traversal path, wherein the related orchestration node subset comprises each navigation orchestration node whose respective coverage region has at least one positional intersection with the candidate traversal path, generating, based at least in part on the path feature set and using the traversal path optimization machine learning model, a path score for the candidate traversal path; and performing one or more prediction-based actions based at least in part on each path score.

In accordance with another aspect, an apparatus comprising at least one processor and at least one memory, including program code, the at least one memory and the program code configured to, with the processor, cause the apparatus to at least: receive a traversal path optimization request from a user device, wherein the traversal path optimization request describes traversal path request data indicative of at least an origin node and a destination node; for each navigation orchestration node, determine, using a node-wise coverage region determination machine learning model, and based at least in part on node feature data describing at least a current operational environment of a corresponding navigation orchestration device that is associated with the navigation orchestration node, a coverage region of the navigation orchestration node; for each candidate traversal path of a plurality of candidate traversal paths: determine a path feature set describing at least a related orchestration node subset of the plurality of navigation orchestration nodes for the candidate traversal path, wherein the related orchestration node subset comprises each navigation orchestration node whose respective coverage region has at least one positional intersection with the candidate traversal path, generate, based at least in part on the path feature set and using the traversal path optimization machine learning model, a path score for the candidate traversal path; and perform one or more prediction-based actions based at least in part on each path score.

In accordance with yet another aspect, a computer program product computer program comprising at least one non-transitory computer-readable storage medium having computer-readable program code portions stored therein, the computer-readable program code portions configured to: receive a traversal path optimization request from a user device, wherein the traversal path optimization request describes traversal path request data indicative of at least an origin node and a destination node; for each navigation orchestration node, determine, using a node-wise coverage region determination machine learning model, and based at least in part on node feature data describing at least a current operational environment of a corresponding navigation orchestration device that is associated with the navigation orchestration node, a coverage region of the navigation orchestration node; for each candidate traversal path of a plurality of candidate traversal paths: determine a path feature set describing at least a related orchestration node subset of the plurality of navigation orchestration nodes for the candidate traversal path, wherein the related orchestration node subset comprises each navigation orchestration node whose respective coverage region has at least one positional intersection with the candidate traversal path, generate, based at least in part on the path feature set and using the traversal path optimization machine learning model, a path score for the candidate traversal path; and perform one or more prediction-based actions based at least in part on each path score.

BRIEF DESCRIPTION OF THE DRAWINGS

Figure 1:
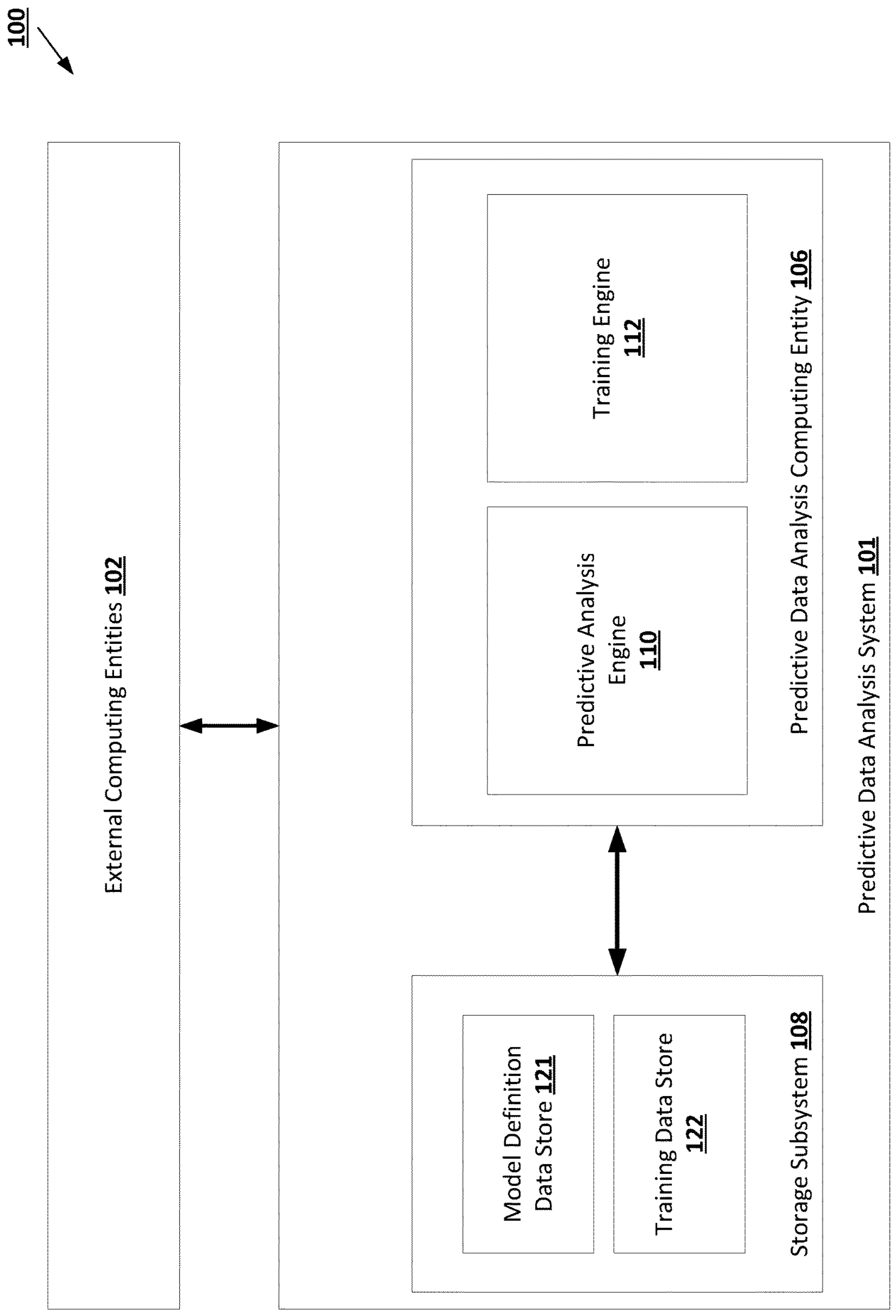

Having thus described the invention in general terms, reference will now be made to the accompanying drawings, which are not necessarily drawn to scale, and wherein:

FIG. 1 provides an exemplary overview of a system that can be used to practice embodiments of the present invention.

Figure 2:
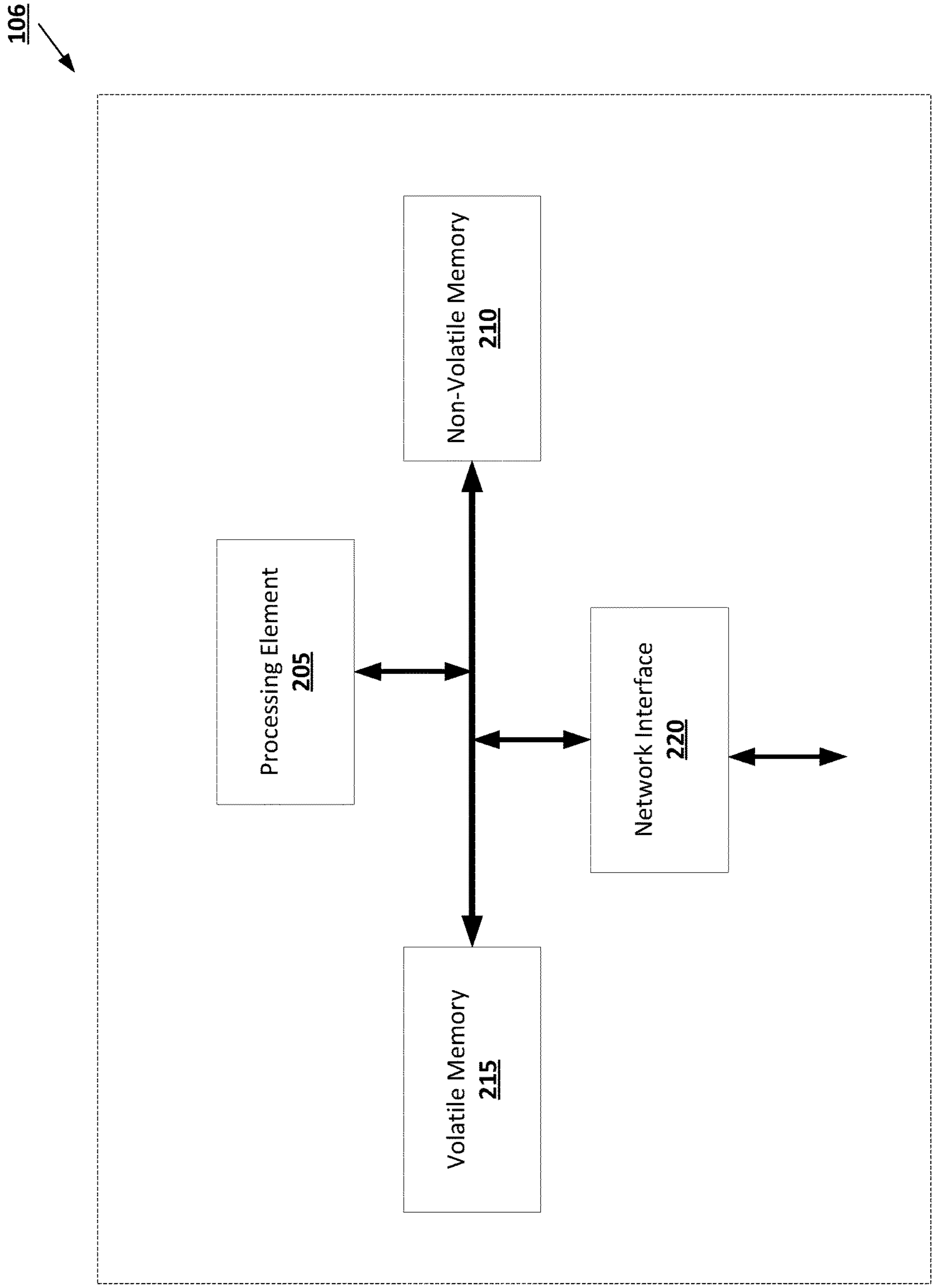

FIG. 2 provides an example predictive data analysis computing entity in accordance with some embodiments discussed herein.

Figure 3:
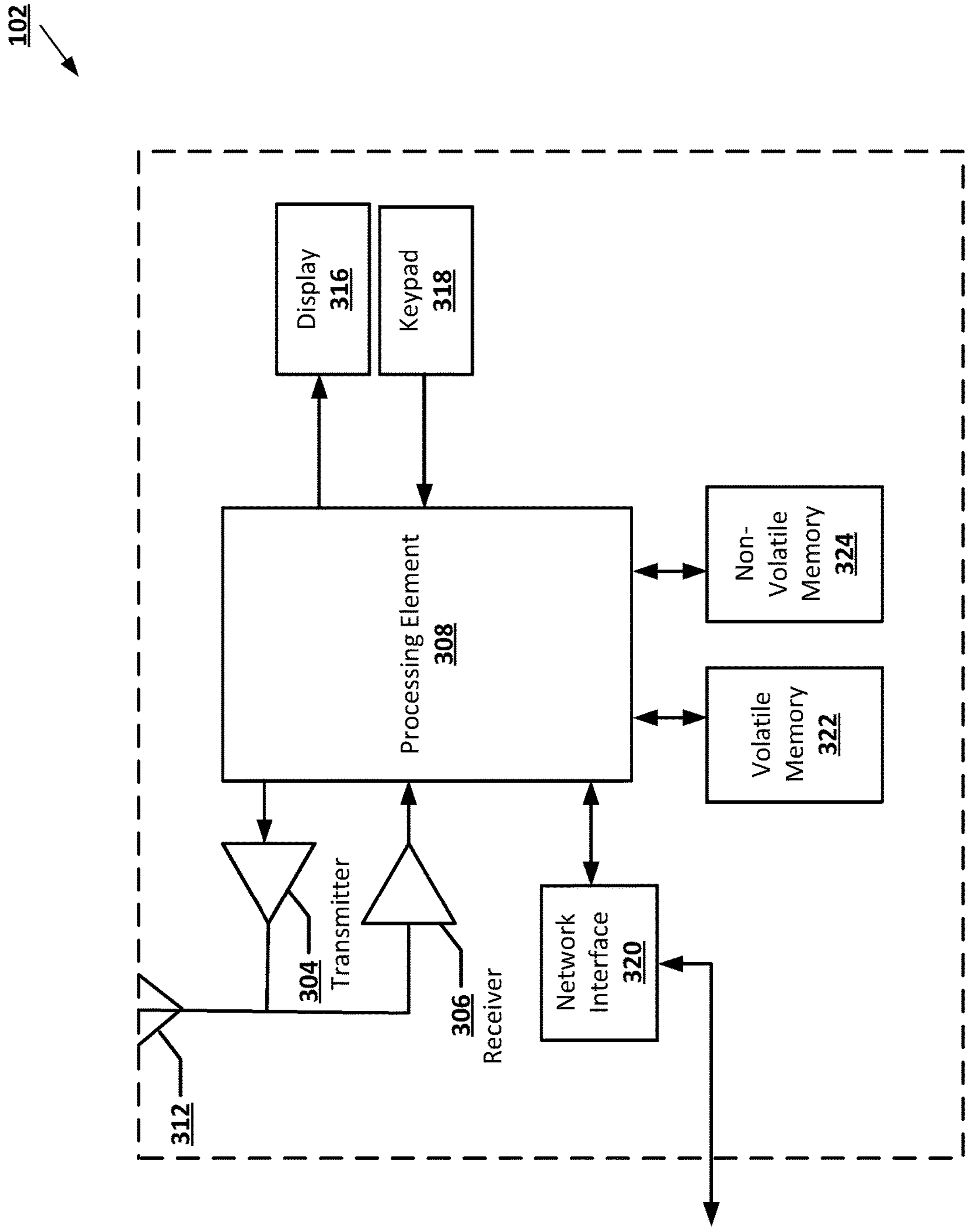

FIG. 3 provides an example external computing entity in accordance with some embodiments discussed herein.

Figure 4:
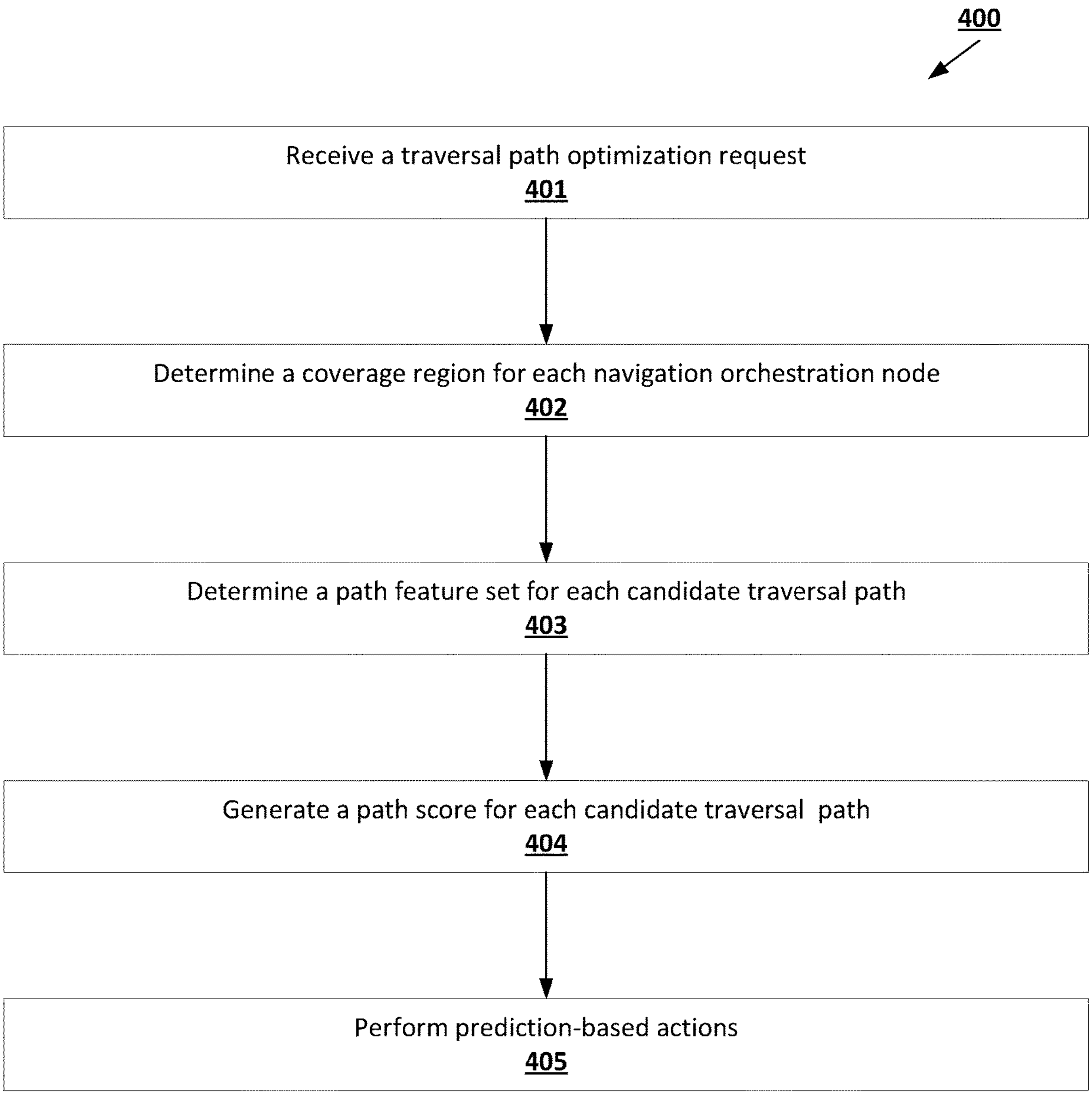

FIG. 4 provides a flowchart diagram of an example process for generating a prediction based at least in part on a path score determined using a traversal path optimization machine learning model in accordance with some embodiments discussed herein.

Figure 5:
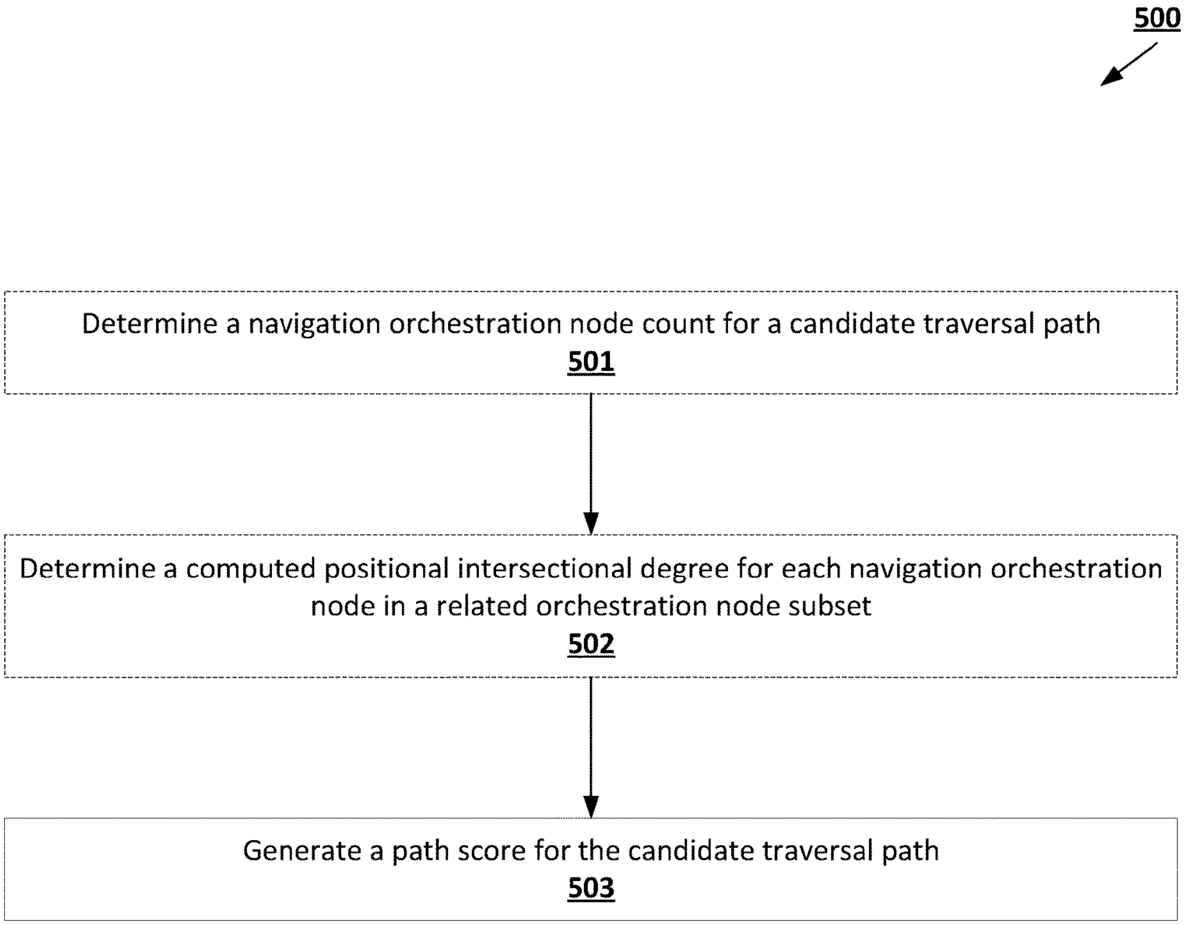

FIG. 5 provides a flowchart diagram of an example process for generating a path score for a particular candidate traversal path in accordance with some embodiments discussed herein.

FIG. 6 provides an operational example of an optimal path traversal alert notification that may be generated in accordance with some embodiments discussed herein.

Figure 7:
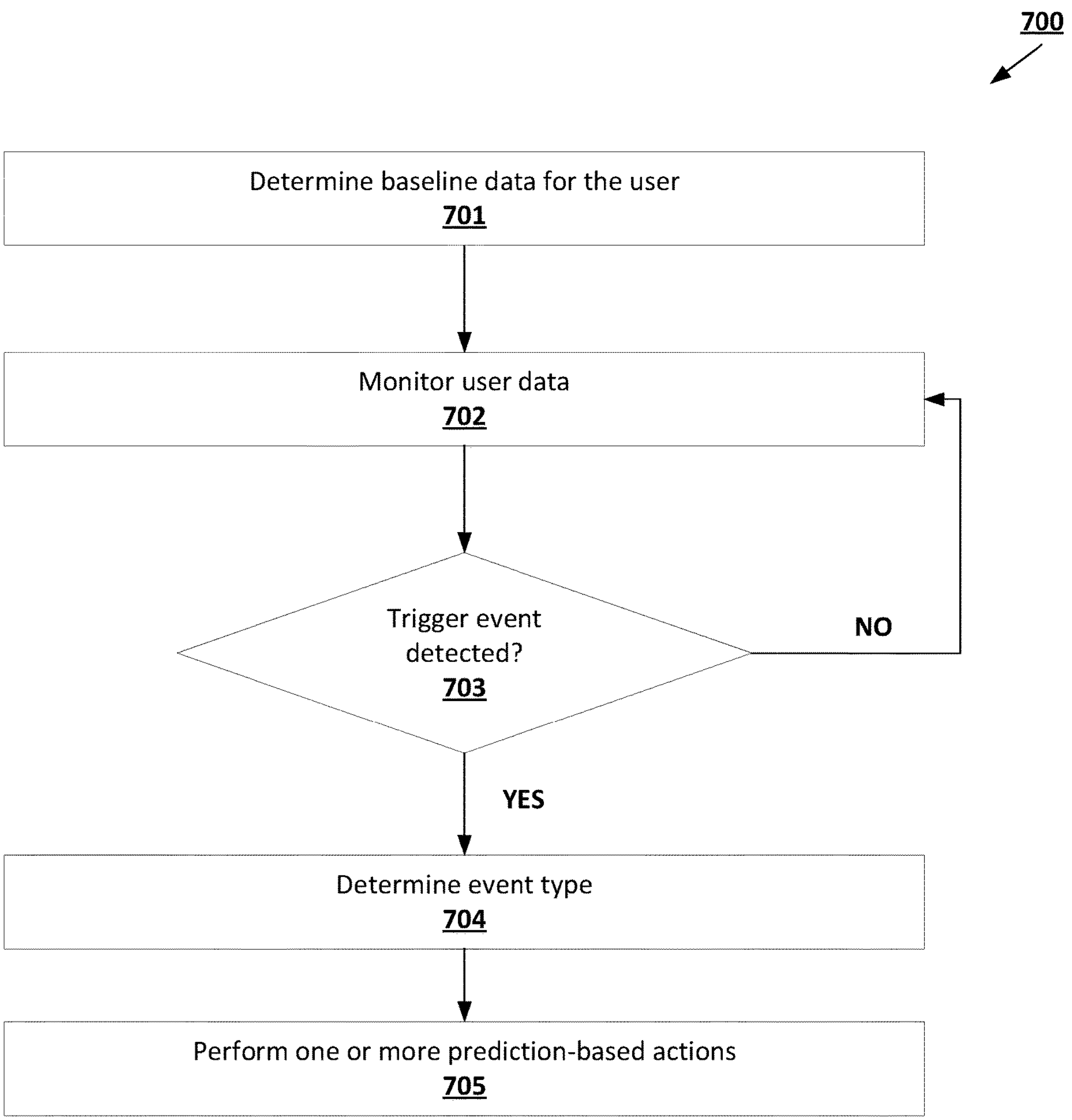

FIG. 7 provides a flowchart diagram of an example process for detecting a trigger event in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention describe techniques for utilizing predictive insights about positioning of orchestration nodes to determine optimal paths across a traversal network. By utilizing predictive insights about positioning of orchestration nodes to determine optimal paths across a traversal network, various embodiments of the present invention enable reducing the computational complexity of performing path optimization by integrating node-wise feature data (e.g., feature data about whether each node is an orchestration node) in addition to link/edge-wise feature data (e.g., link/edge weights) to determine optimal paths across a traversal network. This in turn reduces the amount of processing resources and/or the amount of time needed to perform path optimizations, which is a critical technical advantage for software applications that require real-time and/or near-real-time path traversal (e.g., speed-critical networking applications, speed-critical navigation application, speed-critical emergency planning applications, and/or the like).

An example of a speed-critical application that may use some of the techniques described herein relates to emergency planning. Individuals may require emergency services (e.g., paramedics, police, etc.) in response to various health-related and/or security-related events. However, individuals who require such emergency service intervention may find it difficult to obtain them during the event. For example, an individual who is experiencing a stroke may find it difficult to call and request medical service dispatch and/or engage in physical interaction with emergency service devices (e.g., depression of a button to dispatch medical services). As such, it may be beneficial to automatically determine whether an individual is experiencing a security-related event and/or health-related event without requiring user input, thereby reducing the time elapsed between the occurrence of the event and the dispatch of emergency services. Furthermore, the automatic determination of the appropriate emergency service to dispatch may be automatically determined based at least in part biometric data of the individual.

Additionally, it may be beneficial for an individual to travel along a traversal path determined to be an optimal traversal path, as this may provide a safe and monitored environment for the user should any such event occur. For example, a traversal path extending from a starting location to a destination location may be associated with a number of security cameras. Such security cameras may deter criminal activity, thereby reducing the likelihood of a user experiencing a security-related event. Additionally, such security camera coverage may provide image data (e.g., photos, videos, etc.) of the individual during his/her travel, such that if the individual does experience a health-related and/or security-related event, the event may be captured and the location of the individual may be discerned based at least in part on the image data.

To address the above-noted technical challenges associated with traversal path optimization, various embodiments of the present invention describe receiving a traversal path optimization request from a user device which describe traversal path request data indicative of at least an origin node and a destination node. For each navigation orchestration node in the traversal network, a coverage region of the navigation orchestration node is determined using a node-wise coverage region determination machine learning model and based at least in part on a current operational environment of a corresponding navigational orchestration device associated with the navigation orchestration node. Then, for each candidate traversal path of a plurality of candidate traversal paths, a path feature set is determined. The path feature set may describe at least a related orchestration node subset of the plurality of orchestration nodes for the candidate traversal path. The related orchestration node subset may include navigation orchestration nodes with respective coverage regions with at least one positional intersection with the candidate traversal path. A traversal path optimization machine learning model may further be configured to generate a path score for each candidate traversal path and one or more prediction-based actions may be performed based at least in part on each path score. For example, an optimal traversal path associated with the largest path score may be selected as the optimal traversal path and an optimal path traversal alert notification indicative of the optimal traversal path may be provided to the user device. The optimal path traversal alert notification may provide user directions along the optimal traversal path such that a user may follow the optimal traversal path route from an initial location to a destination location. In this way, the user may reduce his/her likelihood of experiencing a security-related event and additionally increase his/her likelihood of the capture of a security-related event and/or health-related event via one or more navigation orchestration devices positioned along the optimal traversal path.

Various embodiments of the present invention make important technical contributions to improving resource-usage efficiency of post-prediction systems by using predicted path scores to set the number of allowed computing entities used by the noted post-prediction systems and thus perform operational load balancing for the post-prediction systems (e.g., for path optimization investigation systems that use predicted path scores as inputs to their investigative operations). For example, in some embodiments, a predictive data analysis computing entity determines D paths scores for the D candidate traversal paths. Then, the count of D candidate traversal paths, along with a resource utilization ratio for each candidate traversal path, can be used to predict a predicted number of computing entities needed to perform post-prediction processing operations (e.g., automated investigation operations, such as automated traversal path optimization investigation operations and/or traversal path monitoring operations) with respect to the D candidate traversal paths. For example, in some embodiments, the number of computing entities needed to perform post-prediction processing operations (e.g., automated investigation operations) with respect to D candidate traversal paths can be determined based at least in part on the output of the equation:

$$R = \text{ceil}\left(\sum_{k}^{k=K} ur_k\right),$$

where R is the predicted number of computing entities needed to perform post-prediction processing operations with respect to the D candidate traversal paths, ceil(•) is a ceiling function that returns the closest integer that is greater than or equal to the value provided as the input parameter of the ceiling function, k is an index variable that iterates over K candidate traversal paths among the D candidate traversal paths that are associated with the highest path scores, and $ur_k$ is the estimated resource utilization ratio for a kth candidate traversal path. In some embodiments, once R is generated, a predictive data analysis computing entity can use R to perform operational load balancing for a server system that is configured to perform post-prediction processing operations (e.g., traversal path optimization investigation operations) with respect to D candidate traversal paths. This may be done by allocating computing entities to the post-prediction processing operations if the number of currently-allocated computing entities is below R, and deallocating currently-allocated computing entities if the number of currently-allocated computing entities is above R.

An exemplary application of various embodiments relates to automatically contacting one or more appropriate services in response to detection of one or more trigger events. In some embodiments, a safety assessment application may be used to collect baseline data from a user. Baseline data may be individualized by using an individual's biometric data and/or other forms of data specific to the user. Baseline data may also be collected from a user device. Data may be collected from a user over a training time period to determine one or more baseline thresholds for one or more data categories. Biometric data may be collected for an individual using one or more devices, sensors, instruments, and/or the like. Biometric data may include one or more measures of photoplethysmography (PPG), heart rate, respiratory rate, blood oxygen concentration, blood pressure, wrist acceleration, wrist temperature, body temperature, and galvanic skin conductance. The one or more biometric measures may be obtained during non-event periods such that the individual is not experiencing a situation which requires emergency intervention. The biometric data may also include biometric measures during periods of normal activity, such as walking, running, exercise, sleeping, driving, etc. Furthermore, other data types, such as phone activity, camera images, sound activity, geolocation data, accelerometer data, gyrometer data, and/or the like may also be collected from one or more devices associated with the user.

In some embodiments, an event prediction machine learning model may process the baseline data and determine one or more baseline thresholds for one or more data categories based at least in part on the collected baseline data. A data category (e.g., heart rate measure, blood pressure measure, geolocation, etc.) may include one or more baseline thresholds based at least in part on the baseline data corresponding to the particular data category. The one or more baseline thresholds may define a measurement maximum and minimum such that measures which fall outside the range defined by the baseline thresholds may define a trigger event. Furthermore, one or more baseline thresholds may be associated with a particular trigger event.

The event prediction machine learning model may also generate one or more trigger events based at least in part on the one or more baseline thresholds. In the event one or more baseline thresholds are not satisfied, a prediction-based action may be taken. The particular action that may be taken may be based at least in part on a priority category, service type category for the trigger event, and/or confidence score for the priority category and/or service type category. The event prediction machine learning model may be configured to assign a trigger event into one or more different event priority categories. Such event priority categories may include a non-emergency category and emergency category. The event priority category may influence the level of service dispatched to the individual. For example, if a user has an increased heart rate of 150 beats per minute (bpm) for around 30 seconds, but other data measures are normal, this may be a non-emergency event. As such, a phone call may be placed to the individual to confirm his/her health. As another example, if a user has an increased heart rate of 150 bpm, increased blood pressure, and decreased blood oxygen levels, this may indicate symptoms of a heart attack and be an emergency event. As such, emergency services may be automatically dispatched to the location of the individual. Furthermore, the event prediction machine learning model may be configured to assign a service type category to the trigger event. A service type category may include law enforcement, medical services, etc. The service type category may influence which service is assigned to handle the event of the individual. A confidence score may also be assigned to the trigger event. The confidence score may be indicative of the confidence that a trigger event has occurred and/or the type of trigger event.

The safety assessment application may monitor various data measures (i.e., biometric data, phone activity, camera images, sound activity, geolocation data, accelerometer data, gyroscope data, etc.) for the individual as collected from various devices.

In the event one or more data measures satisfy one or more baseline thresholds are not satisfied, the safety assessment application may determine a trigger event. Based at least in part on the one or more baseline thresholds which are no longer satisfied, an event priority category and service type category may be determined for the trigger event. A confidence score may also be assigned to the trigger event priority category and/or service type category.

A notification message may be sent to the appropriate service indicated based at least in part on the event priority category and service type category may be determined for the trigger event. The location of the device associated with the user, the type of predicted trigger event (e.g., cardiac event, burglary, etc.), the data measures that triggered the event, and/or the like may be included in a notification message sent to one or more corresponding services. In some embodiments, the notification message may be conditionally sent based at least in part to a user response to a check-in notification. For example, a check-in notification may require a user to interact with one or more selectable items on an associated user device, such as a "yes" or "no" button indicative of whether the user requires emergency services. If the user chooses the affirmative button or does not interact with the check-in notification within a predefined time period (e.g., within 10 seconds), emergency services may be dispatched to the user.

An estimated time or arrival may be determined and presented to the user in the event emergency services are dispatched. The estimated response time may be determined based at least in part on the location of the user and/or historical response times for the dispatched service.

In addition to contacting the appropriate service entity, one or more nearby individuals may also be alerted such that they may assist the individual. The safety assessment application may determine nearby user devices using any suitable method. User devices which are detected to be within a predetermined range may be contacted such that the end users are alerted to the situation. The alerted end users may also confirm whether the situation requires emergency services, the type of emergency services required, etc.

Additionally, the safety assessment application may determine nearby devices (e.g., security cameras). The safety assessment application may determine one or more devices within a predetermined range and may cause an event notification to be provided to the one or more devices. The event notification may cause the one or more devices to update and/or modify a current operational state. For example, a security camera may change its orientation to capture the event.

II. Definitions of Certain Terms

The term "traversal path optimization request" may refer to a data construct that describes traversal path request data as requested by a user via a user device. The traversal path optimization request may describe traversal path request data indicative of at least an origin node and a destination node. An origin node may correspond to a user starting location and a destination node may correspond to a user ending location. In particular, a point of interest node which is geographically the closest to the initial location of the user may be determined as the origin node and a point of interest node which is geographically the closest to the destination location may be determined as the destination node. In some embodiments, the traversal path request data may further indicate one or more intermediary nodes, indicative of one or more locations between a starting location and destination location. Similarly, a point of interest node which is geographically the closest to the requested intermediary location may be determined as an intermediary node The term "traversal network" may refer to a data construct configured to describe relative positioning of a set of nodes, including whether each pair of nodes is directly connected through a direct pathway. The traversal network may be a heterogenous traversal network which includes nodes of different types. In some embodiments, the one or more nodes of the traversal network may include one or more point of interest nodes and/or one or more navigation orchestration nodes.

The term "nodal group" may refer to a data construct configured to describe a subsection of the traversal network. A nodal group may correspond to a particular geographic region. For example, a nodal group may correspond to a park, building, town, city, community city region, and/or the like. Each node of a traversal network may correspond to one or more nodal groups.

The term "point of interest node" may refer to a data construct which corresponds to a node within the traversal network that is indicative of a geographic point of interest (e.g., hotels, restaurants, museums, stadiums, offices, auto repair shops, buildings, stores, parks, landmarks, geographic features, etc.). Each point of interest node may be associated with node feature data. Node feature data may describe a location for an associated point of interest corresponding to the point of interest node. For example, node feature data may include GPS coordinates, an address, or other indicators indicative of a geographic location of the point of interest. The node feature data may further include an encompassed area measure indicative of the size of the point of interest.

The term "navigation orchestration node" may refer to a data construct which corresponds to a node within the traversal network that corresponds to a navigation orchestration device and/or describes attribute data associated with a corresponding navigation orchestration device. Each navigation orchestration node may be associated with node feature data. For a navigation orchestration node, node feature data may describe a current operational environment for the corresponding orchestration device associated with the navigation orchestration node. In some embodiments, a current operational environment may describe a corresponding navigation orchestration device configuration (e.g., a resolution, FOV, zoom capabilities, rotation capabilities, night vision capabilities, operating temperatures range, water-proof ratings, and/or the like). The current operational environment may further describe one or more sensor measurements (e.g., rotation, internal temperature, environmental temperature, connection status, and/or the like), as measured by the corresponding navigation orchestration device. Each point of interest node may be associated with node feature data. Node feature data may describe a location for an associated point of interest corresponding to the point of interest node. For example, node feature data may include GPS coordinates, an address, or other indicators indicative of a geographic location of the point of interest. The node feature data may further include an encompassed area measure indicative of the size of the point of interest.

The term "navigation orchestration device" may refer to any electronic device configured with a camera and capable of electronically transmitting image data (e.g., photographs, video data, etc.). Example navigation orchestration devices may include security cameras and/or the like. A navigation orchestration device may be configured to stream image data in real-time or near real-time to one or more external computing entities 102. Alternatively, a navigation orchestration device may be configured to transmit the image data periodically or semi-periodically to one or more external computing entities 102. In some embodiments, the navigation orchestration device may be configured to store the image data in an associated memory. The navigation orchestration device may be configured with one or more sensors (e.g., accelerometers, gyroscopes, magnetometers, thermometers, etc.) such that the navigation orchestration device may determine one or more measurements via the sensors.

The term "candidate traversal path" may refer to a data construct which describes a route which includes two or more point of interest nodes which includes the origin node and the destination node. The candidate traversal path may also include the one or more intermediary nodes, if requested by the user. A candidate traversal path may be determined using one or more point of interest nodes included in the nodal group and may be determined by performing a graph search, or any other algorithmic search, to determine route from an origin node, optionally to one or more intermediary nodes, and then to a destination node. Each candidate traversal route may be associated with a traversal path node set which includes each point of interest node of the candidate traversal path from the origin node to the destination node.

The term "node-wise coverage region determination machine learning model" may refer to a data construct that describes parameters, hyper-parameters, and/or defined operations of a machine learning model, where the machine learning model is configured to process node feature data for each navigation orchestration device and determine a corresponding coverage region of a navigation orchestration node. The node-wise coverage machine learning model may determine a coverage region for each navigation orchestration node within a proximity of an origin node and/or or a destination node. In some embodiments, the node-wise coverage region determination machine learning model may be a trained neural network machine learning model. The node-wise coverage region machine learning model may be configured to determine a coverage region for a respective navigation orchestration node based at least in part on a current operational environment for the corresponding navigation orchestration node. In some embodiments, the node-wise coverage region determination machine learning model may be configured to determine a coverage region for the corresponding navigation orchestration node based at least in part on the corresponding navigation orchestration device configuration and/or one or more sensor measurements, as measured by the navigation orchestration device as described by the current operational environment. In some embodiments, the node-wise coverage region determination machine learning model may additionally determine the coverage region based at least in part on third party data (e.g., weather-related data) and may have a smaller coverage region as compared when the geographic area is not experiencing a weather event. The node-wise coverage region determination machine learning model may be configured to output the coverage region as a vector, which may be indicative of a geographic perimeter of the coverage region. Alternatively, the node-wise coverage region determination machine learning model may be configured to output the coverage region as an atomic value, indicative of a radius associated with the point of interest.

The term "path feature set" may refer to a data construct which describes a related orchestration node subset of the plurality of navigation orchestration nodes for a candidate traversal path. In particular, the related orchestration node subset may include each navigation orchestration node with a respective coverage region which has at least one positional intersection with a candidate traversal path.

The term "traversal path optimization machine learning model" may refer to a data construct that describes parameters, hyper-parameters, and/or defined operations of a machine learning model, where the machine learning model is configured to process a path feature set to determine a path feature score for each candidate traversal path. In some embodiments, the traversal path optimization machine learning model may determine a navigation orchestration node count based at least in part on the number of navigation orchestration nodes included in the related orchestration node subset for each candidate traversal path. In some embodiments, the traversal path optimization machine learning model may determine a positional intersectional degree for each navigation orchestration node based at least in part on the coverage region associated with the navigation orchestration node. A navigation orchestration node may be associated with node feature data indicative of a location of the corresponding navigation orchestration device and the corresponding coverage region associated with the navigation orchestration node may correspond to a geographic region centered about and/or around the location of the navigation orchestration device. Additionally, each point of interest node included in traversal path node set for the candidate traversal path may also be associated with node feature data indicative of a location and/or encompassed geographic region corresponding to the point of interest. The traversal path optimization machine learning model may determine the amount of overlap between the coverage region for each navigation orchestration node and the location of a point of interest corresponding to a point of interest node included in the traversal path node set. For example, the traversal path optimization machine learning model may determine a percentage of overlap between the coverage region for each navigation node and the location of a point of interest corresponding to the point of interest node included in the traversal path node set. The traversal path optimization machine learning model may then determine the computed positional intersection degree based at least in part on the amount of overlap between the coverage region for each navigation orchestration node and the location of a point of interest corresponding to a point of interest node included in the traversal path node set. Additionally or alternatively, the traversal path optimization machine learning model may determine whether the coverage region for each navigation orchestration node intersects, overlaps or otherwise includes an edge between two point of interest nodes of the candidate traversal path. In some embodiments, node feature data for each node may also be indicative of a location of a geographical route between two points of interest, which corresponds to a particular edge connecting the corresponding point of interest nodes. The traversal path optimization machine learning model may determine the amount of overlap between coverage region and the location of the geographic region and/or route between two points of interest corresponding to an edge connecting two point of interest nodes of the candidate route. For example, the traversal path optimization machine learning model may determine a percentage of overlap between coverage region and the location of the geographic region and/or route between two points of interest corresponding to an edge connecting two point of interest nodes of the candidate route. The traversal path optimization machine learning model may then determine the computed positional intersection degree based at least in part on the amount of overlap between coverage region and the location of the geographic region and/or route between two points of interest corresponding to an edge connecting two point of interest nodes of the candidate route. The traversal path optimization machine learning model may determine the path score for the candidate path based at least in part on the navigation orchestration node count and/or the computed positional intersectional degree. In some embodiments, the traversal path optimization machine learning model may be configured to generate the path score for the candidate traversal path based at least in part on each orchestration capability measure for each related orchestration node subset. The orchestration capability measure may be indicative of a relative quality of the orchestration navigation device corresponding to the navigation orchestration node. The traversal path optimization machine learning model may be configured to determine an orchestration capability measure based at least in part on the node feature data associated with the navigation orchestration node, such as the one or more navigation orchestration device configurations. The traversal path optimization machine learning model may be configured to output each path score as an atomic value. Alternatively, the traversal path optimization machine learning model may be configured to output the path scores for each candidate traversal path as an ordered vector, wherein the position of the path score in the ordered vector is indicative of the corresponding candidate traversal path.

The term "optimal path traversal alert notification" may refer to a data construct that is configured to indicate a candidate traversal path selected as the optimal traversal path and may be provided to the user device. The candidate traversal path selected as the optimal traversal path may be the candidate traversal associated with the largest path score. The optimal path traversal alert notification may provide an indication of one or more navigation directions for the optimal path traversal route. The optimal path traversal alert notification may indicate total distance of the optimal traversal route and/or a distance associated with a route between two locations. The optimal path traversal alert notification may further include an indication of a number of navigation orchestration devices along the optimal traversal path and/or may display the location of the navigation orchestration devices on the route. Optionally, the optimal path traversal alert notification may indicate one or more biometric measures associated with the user during their travel along the optimal traversal path. The optimal path traversal alert notification may further indicate an estimated time of arrival (ETA) for one or more emergency response services (e.g., emergency medical service (EMS), police service, firefighter service, etc.).

The term "event prediction machine learning model" may refer to a data construct that describes parameters, hyper-parameters, and/or defined operations of a machine learning model, where the machine learning model is configured to process biometric data from one or more user devices and determine whether a trigger event is detected. In some embodiments, the event prediction machine learning model may process the baseline data for the user and determine one or more baseline thresholds for one or more data categories based at least in part on the collected baseline data. A data category (e.g., heart rate measure, blood pressure measure, geolocation, etc.) may include one or more baseline thresholds based at least in part on the baseline data corresponding to the particular data category. The one or more baseline thresholds may define a measurement maximum and minimum such that measures which fall outside the range defined by the baseline thresholds may define a trigger event. The event prediction machine learning model may be configured to assign a trigger event into one or more different event priority categories. Such event priority categories may include a non-emergency category and emergency category. The event priority category may influence the level of service dispatched to the individual. Furthermore, the event prediction machine learning model may be configured to assign a service type category to the trigger event. A service type category may include law enforcement, medical services, etc. The service type category may influence which service is assigned to handle the trigger event of the individual. A confidence score may also be assigned to the trigger event. The confidence score may be indicative of the confidence that a trigger event has occurred and/or certainty about the type of trigger event.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially, such that one instruction is retrieved, loaded, and executed at a time. In some exemplary embodiments, retrieval, loading, and/or execution may be performed in parallel, such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

FIG. 1 is a schematic diagram of an example system architecture 100 for performing predictive data analysis operations and for performing one or more prediction-based actions (e.g., generating corresponding user interface data). The system architecture 100 includes a predictive data analysis system 101 comprising a predictive data analysis computing entity 106 configured to generate predictive outputs that can be used to perform one or more prediction-based actions. The predictive data analysis system 101 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). An example of a prediction that may be generated by using the system architecture 100 is to generate path scores for a plurality of candidate traversal paths and provide an indication of an optimal traversal path based at least in part on an associated path score to a user device.

The system architecture 100 includes a storage subsystem 108 configured to store at least a portion of the data utilized by the predictive data analysis system 101. The predictive data analysis computing entity 106 may be in communication with one or more external computing entities 102. The predictive data analysis computing entity 106 may be configured to train a prediction model (e.g., node-wise coverage region determination machine learning model, traversal path optimization machine learning model, and/or the event prediction machine learning model) based at least in part on the training data store 122 stored in the storage subsystem 108, store trained prediction models as part of the model definition data store 121 stored in the storage subsystem 108, utilize trained models to generate predictions based at least in part on structured feature data that may be provided by an external computing entity 102, and perform prediction-based actions based at least in part on the generated predictions. The storage subsystem may be configured to store the model definition data store 121 for one or more predictive analysis models and the training data store 122 uses to train one or more predictive analysis models. The predictive data analysis computing entity 106 may be configured to receive requests and/or data from external computing entities 102, process the requests and/or data to generate predictive outputs (e.g., an optimal traversal path indication), and provide the predictive outputs to the external computing entities 102. The external computing entity 102 may periodically update/provide raw input data (e.g., traversal path optimization request) to the predictive data analysis system 101. The external computing entities 102 may further generate user interface data (e.g., one or more data objects) corresponding to the predictive outputs and may provide (e.g., transmit, send, and/or the like) the user interface data corresponding with the predictive outputs for presentation to user computing entities operated by end-users.

The storage subsystem 108 may be configured to store at least a portion of the data utilized by the predictive data analysis computing entity 106 to perform predictive data analysis steps/operations and tasks. The storage subsystem 108 may be configured to store at least a portion of operational data and/or operational configuration data including operational instructions and parameters utilized by the predictive data analysis computing entity 106 to perform predictive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The predictive data analysis computing entity 106 includes a predictive analysis engine 110 and a training engine 112. The predictive analysis engine 110 may be configured to perform predictive data analysis based at least in part on a received traversal path optimization request. For example, the predictive analysis engine 110 may be configured to perform one or more prediction based actions based at least in part on a path score. The training engine 112 may be configured to train the predictive analysis engine 110 in accordance with the training data store 122 stored in the storage subsystem 108.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with a processing element 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry, and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry, and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 ultra-wideband (UWB), infrared (IR) protocols, near field communication (NFC) protocols, Wibree, short-range wireless interconnection protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 (e.g., a navigation orchestration device) that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, IEEE 902.11, UWB, IR, NFC, short-range wireless interconnection protocols, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts, such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, network access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, network access points, cellular towers, nearby computing devices (e.g., smartphones, laptops) and/or the like. For instance, such technologies may include the iBeacons, Gimbal proximity beacons, short-range wireless transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionalities that are the same or similar to those of the predictive data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as a personal home assistant, and/or the like. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined event.

V. Exemplary System Operations

As described below, various embodiments of the present invention make important technical contributions to accurately and efficiently determine optimal traversal paths for a user. In doing so, the techniques described herein improve the efficiency and accuracy of optimal traversal path determinations for a user. In particular, a nodal group of the traversal network may be determined for the user based at least in part on the traversal path request data, thus reducing the number of nodes considered and thereby reducing consumption of computational resources and improving speed of optimal path determinations. Furthermore, the techniques described herein allow for the consideration of a correlation relationship between a navigation orchestration device and a point of interest via a corresponding edge between the associated navigation orchestration node and point of interest node.

As further described below, various embodiments of the present invention describe techniques for utilizing predictive insights about positioning of orchestration nodes to determine optimal paths across a traversal network. By utilizing predictive insights about positioning of orchestration nodes to determine optimal paths across a traversal network, various embodiments of the present invention enable reducing the computational complexity of performing path optimization by integrating node-wise feature data (e.g., feature data about whether each node is an orchestration node) in addition to link/edge-wise feature data (e.g., link/edge weights) to determine optimal paths across a traversal network. This in turn reduces the amount of processing resources and/or the amount of time needed to perform path optimizations, which is a critical technical advantage for software applications that require real-time and/or near-real-time path traversal (e.g., speed-critical networking applications, speed-critical navigation application, speed-critical emergency planning applications, and/or the like).

Optimal Traversal Path Determination

FIG. 4 is a flowchart diagram of an example process 400 for generating a prediction based at least in part on a path score determined using a traversal path optimization machine learning model. Via the various steps/operations of the process 400, the predictive data analysis computing entity 106 can determine an optimal traversal path for a user in response to a traversal path optimization request provided via a corresponding user device.

The process 400 begins at step/operation 401 when the predictive data analysis computing entity 106 receives a traversal path optimization request. The traversal path optimization request may be received from a user device and may describe traversal path request data. The traversal path request data may be indicative of at least an origin node and a destination node as requested by a user associated with the user device. In some embodiments, an origin node corresponds to an initial or starting geographic location for a user and a destination node corresponds to an ending geographic location requested by the user.

The predictive data analysis computing entity 106 may determine an origin node based at least in part on the initial location and a destination node based at least in part on the ending location as provided by the user. The predictive data analysis computing entity 106 may determine an origin node, and in particular, a point of interest node, which is geographically the closest to the initial location of the user. Similarly, the predictive data analysis computing entity 106 may determine a destination node, and in particular, a point of interest node, which is geographically the closest to the destination location requested by the user.

In some embodiments, a user may provide a destination location and/or starting location to the predictive data analysis computing entity 106. For example, a user may provide an initial location address and/or a destination location address and the predictive data analysis computing entity 106 may be configured to determine a corresponding origin node and destination node based at least in part on the provided addresses.

Alternatively, the predictive data analysis computing entity 106 may provide a user device with a representative interaction map representing one or more points of interest within a proximity of a user device based at least in part on a user device location and/or pertaining to a nodal group (as will be discussed in greater detail below). The provision of the representative map may cause the user device to display the representative map to the user. The predictive data analysis computing entity 106 may then receive an indication of a starting location and/or destination location based at least in part on user interaction with the provided representative map. For example, a user device may indicate the user device is located within a park (i.e. pertaining to a corresponding park nodal group) and the predictive data analysis computing entity 106 may be configured to provide a representative map of the park with one or more points of interest associated with the park (i.e., one or more point of interest nodes associated with the corresponding nodal group).

In some embodiments, the traversal path request data may further be indicative of one or more intermediary nodes. The one or more intermediary nodes may be point of interest nodes, which corresponds to an intermediate geographic location between an initial location and a destination node as requested by the user. For example, a user may have an initial starting location at point A and indicate a destination location of point C. The user may indicate an intermediate location of point B that may occur in between point A and C. As such, a route for the user may be determined from point A, to point B, and then to point C.

In some embodiments, a nodal group of a traversal network may be determined based at least in part on the initial geographic location for the user and the ending geographic location requested by the user. A nodal group may correspond to a particular geographic region. For example, a nodal group may correspond to a park, building, town, city, community city region, and/or the like. Each node of a traversal network may correspond to one or more nodal groups.

The predictive data analysis computing entity 106 may select one or more nodal groups from the traversal network based at least in part on the initial geographic location and the ending geographic location requested by the user. For example, a user may provide an indication that they are initially in park ABC and want to travel to a water fountain feature on the other side of park ABC. The predictive data analysis computing entity 106 may thus determine a nodal group which corresponds to park ABC. As another example, a user may provide an indication that they are initially in park ABC and want to travel to a building XYZ in town. The predictive data analysis computing entity 106 may thus determine a nodal group which corresponds to park ABC.

A traversal network may include one or more nodes within the traversal network and may be a heterogenous traversal network which includes nodes of different types. The one or more nodes and one or more edges connecting the one or more nodes. In particular, the one or more nodes of the traversal network may include one or more point of interest nodes. A point of interest node may correspond to a point of interest (e.g., hotels, restaurants, museums, stadiums, offices, auto repair shops, buildings, stores, parks, landmarks, geographic features, etc.). Each point of interest node may be associated with node feature data. Node feature data may describe a location for an associated point of interest corresponding to the point of interest node. For example, node feature data may include GPS coordinates, an address, or other indicators indicative of a geographic location of the point of interest. The node feature data may further include an encompassed area measure indicative of the size of the point of interest.

The traversal network may further define a navigation orchestration node. A navigation orchestration node may correspond to a navigation orchestration device. Each navigation orchestration node may also be associated with node feature data. For a navigation orchestration node, node feature data may describe a current operational environment for the corresponding orchestration device associated with the navigation orchestration node. In some embodiments, a current operational environment may describe a corresponding navigation orchestration device configuration (e.g., a resolution, FOV, zoom capabilities, rotation capabilities, night vision capabilities, operating temperatures range, water-proof ratings, and/or the like). The current operational environment may further describe one or more sensor measurements (e.g., rotation, internal temperature, environmental temperature, connection status, and/or the like) as measured by the corresponding navigation orchestration device.

A navigation orchestration device may include any electronic device configured with a camera that is capable of electronically recording, storing, and/or transmitting image data (e.g., photographs, video data, etc.). Example navigation orchestration devices may include security cameras and/or the like. A navigation orchestration device may be configured to stream image data in real-time or near real-time to one or more external computing entities 102. Alternatively, a navigation orchestration device may be configured to transmit the image data periodically or semi-periodically to one or more external computing entities 102. In some embodiments, the navigation orchestration device may be configured to store the image data in an associated memory. The navigation orchestration device may be configured with one or more sensors (e.g., accelerometers, gyroscopes, magnetometers, thermometers, etc.) such that the navigation orchestration device may determine one or more measurements via the sensors.

The traversal network may further define one or more edges between nodes. In some embodiments, the length of an edge between two point of interest nodes may be representative of the geographic distance between the corresponding geographic locations of the two point of interest nodes or geographic distance of a path between the corresponding geographic locations described by the two point of interest nodes. The length of an edge between a point of interest node and a navigation orchestration device may be indicative of the geographic distance between the nodes. Alternatively, the length of an edge between a point of interest node and a navigation orchestration device may be indicative of a correlation relationship between the corresponding navigation orchestration device and the geographic location of the point of interest. For example, a navigation orchestration node corresponding to a navigation orchestration device with high visibility of the point of interest may have a shorter edge with the corresponding point of interest node as compared to a navigation orchestration node corresponding to a navigation orchestration device with low visibility of the point of interest. As such, the edge length between a point of interest node and navigation orchestration node may be determined based at least in part on the correlation relationship between the corresponding navigation orchestration device and the geographic location, thereby accounting for the relative visibility and clarity the navigation orchestration device has with respect to the geographic region.

At step/operation 402, the predictive data analysis computing entity 106 may determine a coverage region for each navigation orchestration node. As described above, the predictive data analysis computing entity 106 may determine a corresponding nodal group based at least in part on the traversal path request data. The nodal group may define a plurality of navigation orchestration nodes and the predictive data analysis computing entity 106 may proceed with determining a coverage region for each navigation orchestration node included in the nodal group.

In some embodiments, the predictive data analysis computing entity 106 may use a node-wise coverage region determination machine learning model to determine a coverage region for each navigation orchestration node. The node-wise coverage region determination machine learning model may be configured to process corresponding node feature data for each navigation orchestration node to determine the coverage region of the navigation orchestration node. In some embodiments, the node-wise coverage region determination machine learning model may be a trained neural network machine learning model. The node-wise coverage region determination machine learning model may be configured to output the coverage region as a vector, which may be indicative of a geographic perimeter of the coverage region. Alternatively, the node-wise coverage region determination machine learning model may be configured to output the coverage region as an atomic value, indicative of a radius associated with the point of interest.

The node-wise coverage region machine learning model may be configured to determine a coverage region for a respective navigation orchestration node based at least in part on a current operational environment for the corresponding navigation orchestration node. In some embodiments, the node-wise coverage region determination machine learning model may be configured to determine a coverage region for the corresponding navigation orchestration node based at least in part on the corresponding navigation orchestration device configuration and/or one or more sensor measurements as measured by the navigation orchestration device, as described by the current operational environment. In some embodiments, the node-wise coverage region determination machine learning model may additionally determine the coverage region based at least in part on third party data (e.g., weather-related data). For example, the node-wise coverage region determination machine learning model may be configured to determine that a navigation orchestration node corresponding to a navigation orchestration device configured with a 4K resolution, wide-angle FOV (e.g., 180 degrees), with 4× zoom capability may be determined to have a larger coverage region as compared to a navigation orchestration node corresponding to a navigation orchestration device configured with a 2K resolution, standard FOV (e.g., 80 degrees), with no zoom capability. As another example, the node-wise coverage region determination machine learning model may determine that a navigation orchestration node corresponding to a navigation orchestration device which has measured a 70 degree Fahrenheit environmental temperature via one or more corresponding sensors may have a larger coverage region as compared to a navigation orchestration node corresponding to a navigation orchestration device which has measured a −10 degree Fahrenheit environmental temperature via one or more corresponding sensors. This may be due to a navigation orchestration device operating in a temperature out of range of an operating temperature associated with the navigation orchestration device. As yet another example, the node-wise coverage region determination machine learning model may determine that a navigation orchestration node corresponding to a navigation orchestration device which is located in a geographic area which has indicated a weather event (e.g., rain, snow, sleet, etc.) may have a smaller coverage region as compared when the geographic area is not experiencing a weather event.

In some embodiments, the node-wise coverage region determination machine learning model may periodically and/or semi-periodically receive updated node feature data for one or more navigation orchestration nodes. For example, the node-wise coverage region determination machine learning model may receive node feature data hourly, daily, weekly, etc. The node-wise coverage region determination machine learning model may update the coverage region of the navigation orchestration node based at least in part on the updated node feature data. As such, the coverage region for each navigation orchestration node may be up-to-date, thereby enhancing optimal path determination accuracy.

At step/operation 403, the predictive data analysis computing entity 106 may determine a path feature set for each candidate traversal path. The predictive data analysis computing entity 106 may determine a candidate traversal path based at least in part on the one or more nodes which include an origin node and a destination node. The candidate traversal path may also include the one or more intermediary nodes, if requested by the user. In particular, the predictive data analysis computing entity 106 may determine a candidate traversal path using one or more point of interest nodes included in the nodal group. The predictive data analysis computing entity 106 may perform a graph search, or any other algorithmic search, to determine a candidate traversal route from an origin node, optionally to one or more intermediary nodes, and then to a destination node. Each candidate traversal route may be associated with a traversal path node set which includes each point of interest node of the candidate traversal path from the origin node to the destination node.

The predictive data analysis computing entity 106 may then determine a path feature set for each candidate traversal path of the plurality of candidate traversal paths. A path feature set may describe at least a related orchestration node subset of the plurality of navigation orchestration nodes for the candidate traversal path. In particular, the related orchestration node subset may include each navigation orchestration node with a respective coverage region which has at least one positional intersection with a candidate traversal path.

A navigation orchestration node may be associated with node feature data indicative of a location of the corresponding navigation orchestration device and the corresponding coverage region associated with the navigation orchestration node may correspond to a geographic region centered about and/or around the location of the navigation orchestration device. Furthermore, each node may also be associated with node feature data indicative of a location, such as the location of a point of interest. The predictive data analysis computing entity 106 may determine whether the coverage region for each navigation orchestration node intersects, overlaps or otherwise includes the location of a point of interest corresponding to any node of the traversal path node set. In an instance a coverage region for a navigation orchestration node includes the location of a point of interest corresponding to any node of the candidate route, a positional intersection is determined for the navigation orchestration node and the navigation orchestration node is appended to the related orchestration node subset.

Additionally or alternatively, the predictive data analysis computing entity 106 may determine whether the coverage region for each navigation orchestration node intersects, overlaps, or otherwise includes an edge between two point of interest nodes of the candidate traversal path. In some embodiments, node feature data for each node may also be indicative of a location of a geographical route between two points of interest, which corresponds to a particular edge connecting the corresponding point of interest nodes. In an instance a coverage region for a navigation orchestration node includes the location of route between two points of interest corresponding to an edge connecting two nodes of the candidate route, a positional intersection is determined for the navigation orchestration node and the navigation orchestration node is appended to the related orchestration node subset.

At step/operation 404, the predictive data analysis computing entity 106 may generate a path score for each candidate traversal path. In some embodiments, the predictive data analysis computing entity 106 may use a traversal path optimization machine learning model to generate the path score for each candidate traversal path.

The traversal path optimization machine learning model may be configured to process a path feature set for each candidate traversal path to determine the path score for each respective candidate path. In some embodiments, the traversal path optimization machine learning model may be a trained neural network machine learning model. The traversal path optimization machine learning model may be configured to output each path score as an atomic value. Alternatively, the traversal path optimization machine learning model may be configured to output the path scores for each candidate traversal path as an ordered vector, wherein the position of the path score in the ordered vector is indicative of the corresponding candidate traversal path.

In some embodiments, step/operation 404 may be performed in accordance with the process that is depicted in FIG. 5, which is an example process for generating a path score for a candidate traversal path. The predictive data analysis computing entity 106 may use the traversal path optimization machine learning model to perform the step/operations described in FIG. 5.

The process that is depicted in FIG. 5 begins at step/operation 501, where the predictive data analysis computing entity 106 may determine a navigation orchestration node count for a candidate traversal path. In particular, the predictive data analysis computing entity 106 may use the traversal path optimization machine learning model to determine the navigation orchestration node count for the candidate traversal path. The traversal path optimization machine learning model may determine the navigation orchestration node count based at least in part on the number of navigation orchestration nodes included in the related orchestration node subset for each candidate traversal path. For example, if seven navigation orchestration nodes are included in the related orchestration node subset, the predictive data analysis computing entity 106 may determine a navigation orchestration node count of seven.

Additionally or alternatively, at step/operation 502, the predictive data analysis computing entity 106 may determine a computed positional intersectional degree for each navigation orchestration node included in the related orchestration node subset for the candidate traversal path. In particular, the predictive data analysis computing entity 106 may use traversal path optimization machine learning model to determine the computed positional intersectional degree for each navigation node. The traversal path optimization machine learning model may determine a positional intersectional degree for each navigation orchestration node based at least in part on the coverage region associated with the navigation orchestration node.

As described above, a navigation orchestration node may be associated with node feature data indicative of a location of the corresponding navigation orchestration device and the corresponding coverage region associated with the navigation orchestration node may correspond to a geographic region centered about and/or around the location of the navigation orchestration device. Additionally, each point of interest node included in traversal path node set for the candidate traversal path may also be associated with node feature data indicative of a location and/or encompassed geographic region corresponding to the point of interest. The traversal path optimization machine learning model may determine the amount of overlap between the coverage region for each navigation orchestration node and the location of a point of interest corresponding to a point of interest node included in the traversal path node set. For example, the traversal path optimization machine learning model may determine a percentage of overlap between the coverage region for each navigation node and the location of a point of interest corresponding to the point of interest node included in the traversal path node set. The traversal path optimization machine learning model may then determine the computed positional intersection degree based at least in part on the amount of overlap between the coverage region for each navigation orchestration node and the location of a point of interest corresponding to a point of interest node included in the traversal path node set.

Additionally or alternatively, the traversal path optimization machine learning model may determine whether the coverage region for each navigation orchestration node intersects, overlaps, or otherwise includes an edge between two point of interest nodes of the candidate traversal path. In some embodiments, node feature data for each node may also be indicative of a location of a geographical route between two points of interest, which corresponds to a particular edge connecting the corresponding point of interest nodes. The traversal path optimization machine learning model may determine the amount of overlap between coverage region and the location of the geographic region and/or route between two points of interest corresponding to an edge connecting two point of interest nodes of the candidate route. For example, the traversal path optimization machine learning model may determine a percentage of overlap between coverage region and the location of the geographic region and/or route between two points of interest corresponding to an edge connecting two point of interest nodes of the candidate route. The traversal path optimization machine learning model may then determine the computed positional intersection degree based at least in part on the amount of overlap between coverage region and the location of the geographic region and/or route between two points of interest corresponding to an edge connecting two point of interest nodes of the candidate route.

At step/operation 503, the predictive data analysis computing entity 106 may generate a path score for the candidate traversal path. In particular, the traversal path optimization machine learning model may determine the path score for the candidate path based at least in part on the navigation orchestration node count and/or the computed positional intersectional degree. For example, the traversal path optimization machine learning model may be configured to increase a path score for a corresponding candidate traversal path for each additional count of navigation orchestration nodes, as indicated by the navigation orchestration node count. As another example, the traversal path optimization machine learning model may be configured to increase a path score for a corresponding candidate traversal path for a larger computed positional intersectional degree.

In some embodiments, the traversal path optimization machine learning model may be configured to generate the path score for the candidate traversal path based at least in part on each orchestration capability measure for each related orchestration node subset. The orchestration capability measure may be indicative of a relative quality of the orchestration navigation device corresponding to the navigation orchestration node. The traversal path optimization machine learning model may be configured to determine an orchestration capability measure based at least in part on the node feature data associated with the navigation orchestration node, such as the one or more navigation orchestration device configurations. Navigation orchestration devices associated with better quality navigation orchestration device configurations may have a higher orchestration capability measure.

Returning to FIG. 4, at step/operation 405, the predictive data analysis computing entity 106 may generate perform one or more prediction-based actions. In some embodiments, the predictive data analysis computing entity 106 may generate and provide an optimal path traversal alert notification to the user device. The optimal path traversal alert notification may indicate a candidate traversal path selected by the predictive data analysis computing entity 106. The candidate traversal path selected as the optimal traversal path may be the candidate traversal associated with the largest path score. The optimal path traversal alert notification may provide an indication of one or more navigation directions for the optimal path traversal route. For example, for an optimal path traversal route that includes point of interest nodes A, B, and C, the optimal path traversal alert notification may include direction starting from a point of interest corresponding to point of interest node A, a route to the point of interest corresponding to point of interest node B which corresponds to an between point of interest node A and point of interest node B, and a route to the point of interest corresponding to point of interest node C which corresponds to an between point of interest node B and point of interest node C.

In some embodiments, the one or more prediction-based actions are performed based at least in part on a distance measure for an optimal traversal path of the plurality of candidate traversal paths. For example, the optimal path traversal alert notification may include a total distance of the optimal traversal path and/or a distance associated with routes between each of the two geographic locations corresponding to two point of interest nodes in the optimal traversal path.

In some embodiments, the predictive data analysis computing entity 106 may receive an indication of an alternative traversal path request from the user device in response to providing an indication of the optimal traversal path to the user device. The alternative traversal path request may indicate that a user would like to travel a different route than the selected optimal traversal path provided in the optimal path traversal alert notification. The predictive data analysis computing entity 106 may then select a candidate traversal path with the next largest path score as the optimal traversal path and perform one or more prediction-based actions based at least in part on the optimal traversal path. For example, the predictive data analysis computing entity 106 may provide another optimal path traversal alert notification to the user device with the updated optimal traversal path (i.e., the candidate traversal path with the next largest path score).

An operational example of the optimal path traversal alert notification 600 is depicted in FIG. 6. As shown in FIG. 6, the optimal path traversal alert notification 600 may indicate a route from a starting location A to a destination location C. Further, the optimal path traversal alert notification may indicate total distance of the optimal traversal route and/or a distance associated with a route between two locations. The optimal path traversal alert notification 600 may further include an indication of a number of navigation orchestration devices along the optimal traversal path and/or may display the location of the navigation orchestration devices on the route.

Additionally, in some embodiments, the optimal path traversal alert notification 600 may indicate one or more biometric measures associated with the user during their travel along the optimal traversal path. The predictive data analysis computing entity 106 may further be configured to predict an estimated time of arrival (ETA) for one or more emergency response services (e.g., emergency medical service (EMS), police service, firefighter service, etc.).

An exemplary prediction-based action relates to performing operational load balancing for a post-prediction system. Various embodiments of the present invention make important technical contributions to improving resource-usage efficiency of post-prediction systems by using predicted path scores to set the number of allowed computing entities used by the noted post-prediction systems and thus perform operational load balancing for the post-prediction systems (e.g., for path optimization investigation systems that use predicted path scores as inputs to their investigative operations). For example, in some embodiments, a predictive data analysis computing entity determines D paths scores for the D candidate traversal paths. Then, the count of D candidate traversal paths, along with a resource utilization ratio for each candidate traversal path, can be used to predict a predicted number of computing entities needed to perform post-prediction processing operations (e.g., automated investigation operations, such as automated traversal path optimization investigation operations and/or traversal path monitoring operations) with respect to the D candidate traversal paths. For example, in some embodiments, the number of computing entities needed to perform post-prediction processing operations (e.g., automated investigation operations) with respect to D candidate traversal paths can be determined based at least in part on the output of the equation:

$$R = \text{ceil}\left(\sum_{k}^{k=K} ur_k\right),$$

where R is the predicted number of computing entities needed to perform post-prediction processing operations with respect to the D candidate traversal paths, ceil(•) is a ceiling function that returns the closest integer that is greater than or equal to the value provided as the input parameter of the ceiling function, k is an index variable that iterates over K candidate traversal paths among the D candidate traversal paths that are associated with the highest path scores, and $ur_k$ is the estimated resource utilization ratio for a kth candidate traversal path. In some embodiments, once R is generated, a predictive data analysis computing entity can use R to perform operational load balancing for a server system that is configured to perform post-prediction processing operations (e.g., traversal path optimization investigation operations) with respect to D candidate traversal paths. This may be done by allocating computing entities to the post-prediction processing operations if the number of currently-allocated computing entities is below R, and deallocating currently-allocated computing entities if the number of currently-allocated computing entities is above R.

Accordingly, various embodiments of the present invention describe techniques for utilizing predictive insights about positioning of orchestration nodes to determine optimal paths across a traversal network. By utilizing predictive insights about positioning of orchestration nodes to determine optimal paths across a traversal network, various embodiments of the present invention enable reducing the computational complexity of performing path optimization by integrating node-wise feature data (e.g., feature data about whether each node is an orchestration node) in addition to link/edge-wise feature data (e.g., link/edge weights) to determine optimal paths across a traversal network. This in turn reduces the amount of processing resources and/or the amount of time needed to perform path optimizations, which is a critical technical advantage for software applications that require real-time and/or near-real-time path traversal (e.g., speed-critical networking applications, speed-critical navigation application, speed-critical emergency planning applications, and/or the like).

User Monitoring During Path Traversal

In some embodiments, once a user is provided with an indication of an optimal traversal path via a corresponding user device, the predictive data analysis computing entity 106 may monitor the user's condition throughout his/her traversal on the optimal traversal path. In some embodiments, the predictive data analysis computing entity 106 may be configured to receive user status indications via the user device. Furthermore, the predictive data analysis computing entity 106 may be in communication with one or more additional user devices, such as items of clothing or accessories worn by the user. The one or more additional user devices may be configured to measure various biometric data for the user, such as heart rate, breathing rate, blood oxygen level, respiration rate, blood pressure, skin temperature, skin moisture, and/or the like. Furthermore, the user device and/or the one or more additional user devices may be configured with one or more accelerometers, gyroscopes, microphones, cameras, and/or the like. As such, the predictive data analysis computing entity 106 may receive biometric data pertaining to the user, as well as environmental data (e.g., audio data and/or video data) from the one or more user devices.

FIG. 7 is a flowchart diagram of an example process 700 for generating a prediction based at least in part on a user data using an event prediction machine learning model. Via the various steps/operations of the process 700, the predictive data analysis computing entity 106 can determine whether to contact emergency services and/or the appropriate emergency service to contact in response to an event detection.

At step/operation 701, the predictive data analysis computing entity 106 may determine baseline data for the user. In some embodiments, prior to the path traversal, the predictive data analysis computing entity 106 may be configured to determine baseline data for the user. Baseline data may be individualized for the user by using a user's biometric data and/or other forms of data specific to the user. Baseline data may also be collected from one or more user devices over a training time period to determine one or more baseline thresholds for one or more biometric data categories.

Biometric data may be collected for an individual using the one or more user devices. Biometric data may include one or more measures of photoplethysmography (PPG), heart rate, respiratory rate, blood oxygen concentration, blood pressure, wrist acceleration, wrist temperature, body temperature, and galvanic skin conductance. The one or more biometric data may be obtained during a non-event period, such that the individual is not experiencing a situation which requires emergency intervention. The biometric data may also include biometric measures during periods of normal activity, such as walking, running, exercise, sleeping, driving, etc. Furthermore, other data types, such as phone activity, camera images, sound activity, geolocation data, accelerometer data, gyroscopic data, and/or the like may also be collected from one or more user devices associated with the user. As such, baseline (e.g., normal) biometric data and activity data is obtained for the user such that deviation from the normal baseline biometric and/or activity data may indicate the occurrence of an emergency event.

At step/operation 702, the predictive data analysis computing entity 106 may be configured to monitor user data via one or more user devices. The predictive data analysis computing entity 106 may use an event prediction machine learning model to process the user data and determine whether a trigger event has been detected.

In some embodiments, the event prediction machine learning model may process the baseline data for the user and determine one or more baseline thresholds for one or more data categories based at least in part on the collected baseline data. A data category (e.g., heart rate measure, blood pressure measure, geolocation, etc.) may include one or more baseline thresholds based at least in part on the baseline data corresponding to the particular data category. The one or more baseline thresholds may define a measurement maximum and minimum such that measures which fall outside the range defined by the baseline thresholds may define a trigger event.

The event prediction machine learning model may be configured to assign a trigger event into one or more different event priority categories. Such event priority categories may include a non-emergency category and emergency category. The event priority category may influence the level of service dispatched to the individual. For example, if a user has an increased heart rate of 150 beats per minute (bpm) for around 30 seconds, but other data measures are normal, this may be a non-emergency event. As such, a phone call may be placed to the individual to confirm his/her health. As another example, if a user has an increased heart rate of 150 bpm, increased blood pressure, and decreased blood oxygen levels, this may indicate symptoms of a heart attack and be an emergency event. As such, emergency services may be automatically dispatched to the location of the individual. Furthermore, the event prediction machine learning model may be configured to assign a service type category to the trigger event. A service type category may include law enforcement, medical services, etc. The service type category may influence which service is assigned to handle the trigger event of the individual. A confidence score may also be assigned to the trigger event. The confidence score may be indicative of the confidence that a trigger event has occurred and/or certainty about the type of trigger event.

The event prediction machine learning model may process the user data as received from the user device in real-time or near real-time to identify whether the user data satisfies the one or more determined baseline thresholds. In the event one or more data measures satisfy one or more baseline thresholds are not satisfied, the event prediction machine learning model may determine a trigger event.

At step/operation 703, in the instance the event prediction machine learning model determines a trigger event (i.e., in response to the one or more baseline thresholds no longer being satisfied), the predictive data analysis computing entity 106 may proceed to step/operation 704. Otherwise, the predictive data analysis computing entity 106 may proceed back to step/operation 702 and may continue to monitor user data.

At step/operation 704, the predictive data analysis computing entity 106 may determine an event type. The predictive data analysis computing entity 106 may determine an event type using the event prediction machine learning model. The event prediction machine learning model may be configured to determine an event type. The event type may be associated with an event priority category (e.g., emergency or non-emergency) and/or a service type (e.g., law enforcement, medical service, etc.).

At step/operation 705, the predictive data analysis computing entity 106 may perform one or more prediction-based actions. In particular, the predictive data analysis computing entity 106 may generate and provide a notification message to an appropriate service based at least in part on the event type. The notification message may include the location of the user device associated with the user, the type of predicted event (e.g., cardiac event, burglary, etc.), the data measures that triggered the trigger event, and/or the like. In some embodiments, the notification message may be conditionally sent based at least in part to a user response to a check-in notification. For example, a check-in notification may require a user to interact with one or more selectable items on an associated user device, such as a "yes" or "no" button indicative of whether the user requires emergency services. If the user chooses the affirmative button or does not interact with the check-in notification within a predefined time period (e.g., within 10 seconds), emergency services may be dispatched to the user.

Furthermore, in some embodiments, the predictive data analysis computing entity 106 may provide a service notification to the user device. The service notification may describe an estimated time or arrival may be determined and presented to the user in the event emergency services are dispatched. The estimated response time may be determined based at least in part on the location of the user and/or historical response times for the dispatched service.

Furthermore, in some embodiments, the predictive data analysis computing entity 106 may provide an emergency event notification to one or more other user devices within a proximity (e.g., 500 yards of the user). The emergency event notification may alert the one or more other users of the type of trigger event and/or a location of the user. As such, the one or more other users may aid the user experiencing the trigger event until emergency services can arrive.

Accordingly, as described above, various embodiments of the present invention describe techniques for utilizing predictive insights about positioning of orchestration nodes to determine optimal paths across a traversal network. By utilizing predictive insights about positioning of orchestration nodes to determine optimal paths across a traversal network, various embodiments of the present invention enable reducing the computational complexity of performing path optimization by integrating node-wise feature data (e.g., feature data about whether each node is an orchestration node) in addition to link/edge-wise feature data (e.g., link/edge weights) to determine optimal paths across a traversal network. This in turn reduces the amount of processing resources and/or the amount of time needed to perform path optimizations, which is a critical technical advantage for software applications that require real-time and/or near-real-time path traversal (e.g., speed-critical networking applications, speed-critical navigation application, speed-critical emergency planning applications, and/or the like).

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

receiving, by one or more processors and from a user device, a traversal path optimization request that identifies an origin node and a destination node within a traversal network, wherein the traversal network comprises a navigation orchestration node that corresponds to an image device positioned within a proximity to the origin node or the destination node;

receiving, by the one or more processors, a candidate traversal path from the traversal network based at least in part on the origin node and the destination node;

receiving, by the one or more processors and from the image device, node feature data associated with an operational environment of the image device, wherein the node feature data identifies a camera field of view (FOV) of the image device;

processing, by the one or more processors, the node feature data with a node-wise coverage region determination machine learning model to receive a coverage region for the image device;

in response to determining that the coverage region overlaps with the candidate traversal path, generating, by the one or more processors and based at least in part on inputting a path feature set for the candidate traversal path to a traversal path optimization machine learning model, a path score for the candidate traversal path, wherein the path feature set is based at least in part on the node feature data; and providing, by the one or more processors and to the user device, an optimal path traversal alert notification that displays the candidate traversal path based at least in part on the path score, wherein the optimal path traversal alert notification displays one or more biometric measures associated with a user and the candidate traversal path and at least one of (i) one or more nodes of the candidate traversal path and a first number of one or more secondary user devices within a proximity to the user device, or (ii) a second number of one or more image devices within a proximity to the user device.

2. The computer-implemented method of claim 1 further comprising:

selecting the candidate traversal path from a plurality of candidate traversal paths in response to determining that the path score is a largest path score of a plurality of path scores respectively corresponding to the plurality of candidate traversal paths.

3. The computer-implemented method of claim 1 further comprising:

determining a navigation orchestration node count associated with the candidate traversal path; and generating the path score for the candidate traversal path based at least in part on the navigation orchestration node count.

4. The computer-implemented method of claim 1 further comprising:

determining a computed positional intersectional degree with respect to a traversal network subset associated with the candidate traversal path; and generating the path score for the candidate traversal path based at least in part on the computed positional intersectional degree.

5. The computer-implemented method of claim 1, wherein the path score for the candidate traversal path is generated based at least in part on an orchestration capability measure for the navigation orchestration node.

6. The computer-implemented method of claim 1 further comprising:

performing one or more prediction-based actions based at least in part on a distance measure for the candidate traversal path.

7. The computer-implemented method of claim 1, wherein the traversal path optimization request further identifies one or more intermediary nodes.

8. The computer-implemented method of claim 1 further comprising:

receiving an indication of an alternative traversal path request from the user device in response to providing an indication of the candidate traversal path to the user device;

selecting another candidate traversal path from a plurality of candidate traversal paths with a next largest path score; and performing one or more prediction-based actions based at least in part on the selected traversal path.

9. The computer-implemented method of claim 1 further comprising updating, using the node-wise coverage region determination machine learning model, the coverage region of the navigation orchestration node in response to receiving updated node feature data.

10. The computer-implemented method of claim 1 further comprising:

initiating, at the user device, a check-in notification comprising one or more selectable buttons; and in response to determining an absence of user input to the check-in notification within a predefined time period, providing an event notification to the one or more secondary user devices within the proximity to the user device.

11. A system comprising:

one or more processors; and one or more memories storing processor-executable instructions that, when executed by the one or more processors, cause the one or more processors to perform operations comprising:

receiving, from a user device, a traversal path optimization request that identifies an origin node and a destination node within a traversal network, wherein the traversal network comprises a navigation orchestration node that corresponds to an image device positioned within a proximity to the origin node or the destination node;

receiving candidate traversal path from the traversal network based at least in part on the origin node and the destination node;

receiving, from the image device, node feature data associated with an operational environment of the image device, wherein the node feature data identifies a camera field of view (FOV) of the image device;

processing the node feature data with a node-wise coverage region determination machine learning model to receive a coverage region for the image device;

in response to determining that the coverage region overlaps with the candidate traversal path, generating, by the one or more processors and based at least in part on inputting a path feature set for the candidate traversal path to a traversal path optimization machine learning model, a path score for the candidate traversal path, wherein the path feature set is based at least in part on the node feature data; and providing, to the user device, an optimal path traversal alert notification that displays the candidate traversal path based at least in part on the path score, wherein the optimal path traversal alert notification displays one or more biometric measures associated with a user and the candidate traversal path and at least one of (i) one or more nodes of the candidate traversal path and a first number of one or more secondary user devices within a proximity to the user device or (ii) a second number of one or more image devices within a proximity to the user device.

12. The system of claim 11, wherein the operations further comprise:

selecting the candidate traversal path from a plurality of candidate traversal paths in response to determining that the path score is a largest path score of a plurality of path scores respectively corresponding to the plurality of candidate traversal paths.

13. The system of claim 11, wherein the operations further comprise:

determining a navigation orchestration node count associated with the candidate traversal path; and generating the path score for the candidate traversal path based at least in part on the navigation orchestration node count.

14. The system of claim 11, wherein the operations further comprise:

determining a computed positional intersectional degree with respect to a traversal network subset associated with the candidate traversal path; and generating the path score for the candidate traversal path based at least in part on computed positional intersection degree.

15. The system of claim 11, wherein the path score for the candidate traversal path is generated based at least in part on an orchestration capability measure for the navigation orchestration node.

16. The system of claim 11, wherein the operations further comprise:

performing one or more prediction-based actions based at least in part on a distance measure for the candidate traversal path.

17. The system of claim 11, wherein the traversal path optimization request further identifies one or more intermediary nodes.

18. The system of claim 11, wherein the operations further comprise:

receiving an indication of an alternative traversal path request from the user device in response to providing an indication of the candidate traversal path to the user device;

selecting another candidate traversal path from a plurality of candidate traversal paths with a next largest path score; and perform one or more prediction-based actions based at least in part on the selected traversal path.

19. The system of claim 11, wherein the operations further comprise:

update, using the node-wise coverage region determination machine learning model, the coverage region of the navigation orchestration node in response to receiving updated node feature data.

20. One or more non-transitory computer-readable media storing processor-executable instructions that, when executed by one or more processors, cause the one or more processors to perform operations comprising:

receiving, from a user device, a traversal path optimization request that identifies an origin node and a destination node within a traversal network, wherein the traversal network comprises a navigation orchestration node that corresponds to an image device positioned within a proximity to the origin node or the destination node;

receiving candidate traversal path from the traversal network based at least in part on the origin node and the destination node;

receiving, from the image device, node feature data associated with an operational environment of the image device, wherein the node feature data identifies a camera field of view (FOV) of the image device;

processing the node feature data with a node-wise coverage region determination machine learning model to receive a coverage region for the image device;

in response to determining that the coverage region overlaps with the candidate traversal path, generating, by the one or more processors and based at least in part on inputting a path feature set for the candidate traversal path to a traversal path optimization machine learning model, a path score for the candidate traversal path, wherein the path feature set is based at least in part on the node feature data; and providing, to the user device, an optimal path traversal alert notification that displays the candidate traversal path based at least in part on the path score, wherein the optimal path traversal alert notification displays one or more biometric measures associated with a user and the candidate traversal path and at least one of (i) one or more nodes of the candidate traversal path and a first number of one or more secondary user devices within a proximity to the user device or (ii) a second number of one or more image devices within a proximity to the user device.

* * * * *